United States Patent [19]

Stuhler et al.

[11] 4,193,308
[45] Mar. 18, 1980

[54] FLUID DASHPOT GYRO STABILIZED PLATFORM CAGING SYSTEM

[76] Inventors: William B. Stuhler, 2502 18th St., Plano, Tex. 75075; Dorsey T. Smith, 3217 Sheridan Dr., Garland, Tex. 75041

[21] Appl. No.: 727,161

[22] Filed: Sep. 27, 1976

[51] Int. Cl.² ............................................. G01C 19/04
[52] U.S. Cl. .................................. 74/5.22; 33/327; 74/5.34; 74/5.5; 343/765
[58] Field of Search ................ 74/5.5, 5.34, 5.22; 33/327; 244/165; 343/709, 710, 765, 766; 188/321

[56] References Cited

U.S. PATENT DOCUMENTS

| | | | |
|---|---|---|---|
| 944,511 | 12/1909 | Schliek et al. | 74/5.5 |
| 1,973,706 | 9/1934 | Hawley | 188/321 |
| 2,349,287 | 5/1944 | Krussmann | 74/5.5 |
| 2,365,727 | 12/1944 | Pike | 74/5.5 |
| 2,899,828 | 8/1959 | Lynn | 74/5.5 |
| 2,931,035 | 3/1960 | Reinhard et al. | 343/766 |
| 3,464,290 | 9/1969 | Brink | 74/5.5 |
| 3,968,496 | 7/1976 | Brunvoll | 343/765 |
| 3,999,184 | 12/1976 | Fuss | 343/765 X |

FOREIGN PATENT DOCUMENTS

| | | | |
|---|---|---|---|
| 2544867 | 4/1976 | Fed. Rep. of Germany | 343/765 |
| 27590 | of 1910 | United Kingdom | 74/5.5 |
| 895064 | 4/1962 | United Kingdom | 74/5.5 |

*Primary Examiner*—Irwin C. Cohen
*Attorney, Agent, or Firm*—Warren H. Kintzinger

[57] ABSTRACT

A caging system for non-closed-loop gyro systems used in gyro stabilized platforms using fluid dashpots in place of automatic caging gyro brakes, torquers, or solenoids. A fluid dashpot is mounted on the gyro stabilized platform for each gyro of the platform with the linear motion of the dashpot along an axis normal to the median general rotational plane of the respective gyro of the platform. Movement of a dashpot linear movement member is greatly accentuated by the dashpot to gyro assembly interconnected linkage as roll component or pitch component amplitude exceeds designed operational gimbal roll and pitch ranges of respectively roll and pitch gyros of the platform.

4 Claims, 4 Drawing Figures

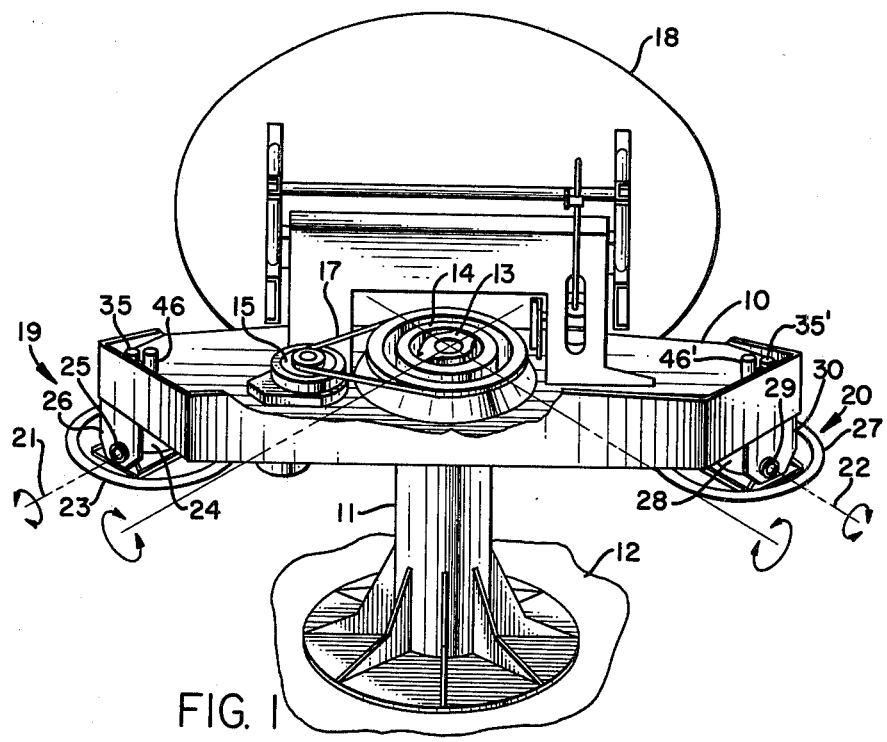

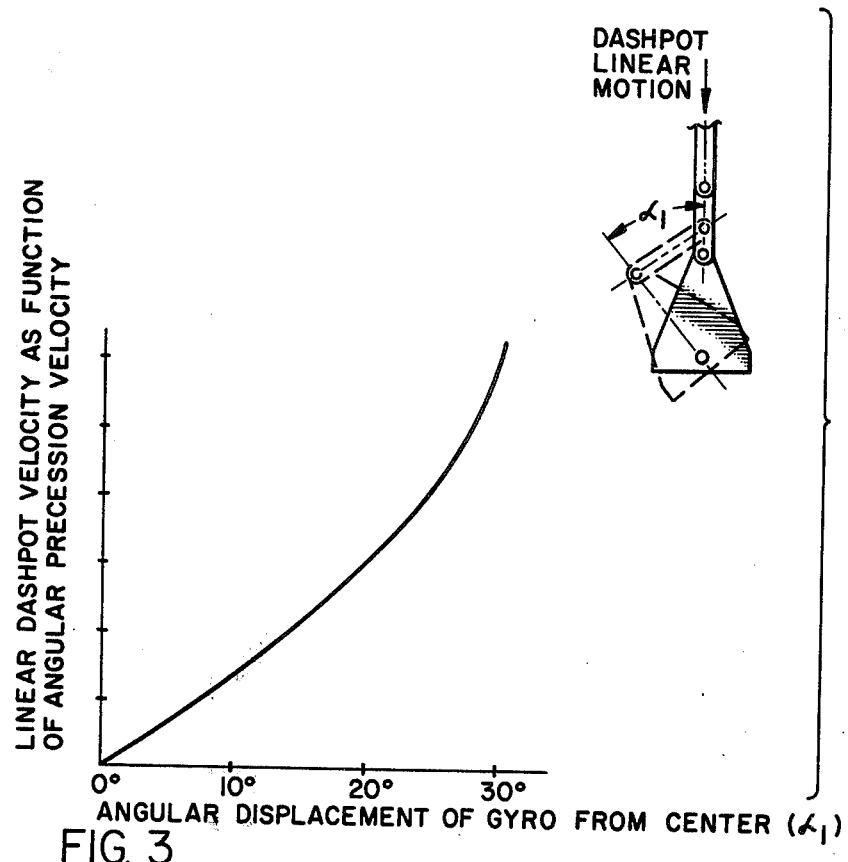

FLUID DASHPOT GYRO STABILIZED PLATFORM CAGING SYSTEM

This invention relates in general to gyro caging systems, and in particular, to a caging system for a non-closed-loop gyro inertial (passive) stabilized platform system.

The use of satellite communication terminals aboard ocean going vessels requires use of stabilized antenna mounting platforms in an environment of significant roll and pitch along with bodily up and down movements. In such a roll and pitch environment it is important to provide means for eliminating low-frequency oscillations in an inertial shipboard antenna stabilization system caused by ship+s motion in excess of those for which the system is designed. The instability condition of concern does not occur under generally encountered normal conditions but does occur when the ship's motion momentarily exceeds the angular freedom provided in the gyro stabilized platform pitch-roll gimbal. Typically, if the gimbal is designed for 35° and the ship rolls 40°, the base and base mount structure will force a 5° error into the platform. With the gyro stabilized platform being an inertial system the platform will try to maintain a 5° error even with the roll amplitude in the next period and successively subsequent periods having returned to being within the 35° design limit since the system has stored sufficient energy in the 5° error excursion to maintain error corresponding to the previous error excursion period. To prevent a continuing error from being sustained (or being dissipated too slowly as with a combination gyro and pendulum stabilized platform) a caging system is required to allow the platform to shift back toward its neutral median gravity position after a period of excess roll or pitch beyond normal design limits. This may be accomplished through "caging" the gyro pivot axes momentarily to restrain the gyros from precessing, thereby momentarily inhibiting stabilizing action of the inertial gyro system to allow re-referencing thereof toward gravity. Caging with gyro stabilized systems has been generally accomplished through automatic brakes, torquers, or solenoids since caging action is generally undesired under normal conditions of operation and must remain disabled other than for extreme motion states in excess of normal design limits.

It is, therefore, a principal object of this invention to provide beyond gimble design movement induced stabilized platform error correction.

Another object is to provide automatic gyro pivot axis re-referencing activation with excess pivot movement beyond design limits.

A further object is to attain automatic gyro stabilized platform re-referencing toward gravity by automatic momentary caging of gyro pivot axis.

Features of this invention useful in accomplishing the above objects include, in a fluid dashpot gyro stabilized platform caging system including a single degree of freedom, platformed mounted gyro, a linkage between gyro rotor housing at a point above the gyro precession axis and the linear motion arm member of a platform mounted dashpot designed to permit unimpeded precession motion over a design range of precession angles either side of the axis normal to the median general rotational plane of the gyro by imparting relatively, small and low rate linear motion to the dashpot linear motion arm member, and to considerably magnify the linear motion rates imparted to the dashpot arm for gyro precession angles in excess of design range. The damping thereby imparted acts in the manner of gyro pivot axis caging to restrain precession, and permits the system to re-reference towards gravity by momentarily inhibiting stabilizing characteristics of the inertial system.

Specific embodiments representing what are presently regarded as the best mode of carrying out the invention are illustrated in the accompanying drawings:

In the drawings:

FIG. 1 represents a non-closed loop stabilized inertial platform system;

FIG. 2, a side elevation view of a fluid dashpot caging system as employed for each gyro of the system of FIG. 1;

FIG. 3, a graph showing the relationship of angular precession velocity and linear dashpot velocity as a function of gyro rotor angular displacement from center; and FIG. 4, a side elevation view of a further embodiment of a fluid dashpot caging system employing an alternate linkage mechanism between dashpot and gyro rotor housing.

Referring to the drawing:

The inertial stabilized platform system of FIG. 1 is of a type using gravity reference for stabilization in pitch and roll—Platform 10 is supported on a pedestal 11 extending from base 12 by means of pitch and roll gimbals 13 and 14. Inner gimbal 13 may be rotatably mounted on pedestal 11 to permit azimuth orientation of the platform by means of drive motor 15, pulley 16 formed on the platform, and drive belt 17. Platform 10 carries thereon an antenna, such as parabolic dish 18 and a pair of gyro assemblies 19 and 20. Gyros 19 and 20 are single-degree-of-freedom mounted with respect to platform 20 so as to define respective orthogonal precession axis 21 and 22, each parallel to, and downwardly displaced from the platform 10. Gyro 19 comprises a rotor or flywheel 23 driven by motor 24 and the rotor assembly is pivotably mounted at 25 in bracket 26, and by an opposite bracket and pivot mount (not shown). The center of gravity of the gyro assembly 19 lies beneath the pivot axis such that the gyro is pendulously urged to gravity reference.

Likewise, gyro 20 comprises a rotor or flywheel 27 driven by motor 28, with rotor assembly pivotably mounted at 29 in bracket 30, and by an opposite bracket and pivot mount (not shown).

The platform of FIG. 1 is statically balanced, and any off-level tendency of platform 10 is counteracted by interacting precession of gyros 19 and 20 to restore the platform 10 to level.

As above discussed, inertial systems such as depicted in FIG. 1 are subject to forced errors when operated in an environment of pitch and roll motions which are in excess of the design limits of the system, and to prevent a continuing error from being sustained, or too slowly dissipated, a caging system is required to allow the platform to shift back towards its neutral median gravity position. This may be accomplished by caging the gyro pivot axes momentarily to restrain the gyros from precessing. The invention herein described is directed to an automatic caging system which restrains gyro precession when pivot angles from normal vertical reference reach and exceed system design limits. As will be further described, the invention employs a fluid dashpot to restrain gyro precession when the precession angle exceeds system design limits. The dashpot is fixed to the platform and the linear motion member of the dashpot is oriented to be normal to the median general rotational plane of the gyro rotor. A linkage mechanism between the dashpot linear motion member and the gyro rotor housing responds to precession motion of the gyro rotor to impart linear motion to the dashpot arm when precession angles are in excess of system design limit magnitudes. Beneath limit magnitudes, the linkage imparts little linear motion. The linear motion rates imparted to the dashpot are magnified in proportion to the precession angle excesses beyond the limit magnitude, i.e., the linear motion is imparted as a non-linear, increasing function of the gyro precession angle and linear motion increments imparted to the dashpot arm per precession angle increment are a direct function of precession angle magnitude. In this manner, little or no precession motion restrain (caging) is imposed for those smaller precession angles which fall within the design limits of the system, while greater precession angles impose restraint automatically with the higher precession rates and greater precession angles producing progressively greater magnification of the linear motion rates imparted to the dashpot arm member, which motion is resisted by the fluid in the dashpot.

FIG. 2 depicts a dashpot and gyro rotor housing linkage interconnect useful in accomplishing the above defined objectives. FIG. 2 is typical of mechanism, which would be associated with each of the gyros 19 and 20 of the inertial system of FIG. 1. FIG. 2 is referenced to gyro 19.

In accordance with the present invention, gyro 19 is fitted with an upwardly extending mounting bracket 31, which may be affixed to gyro rotor housing 24 by means of fasteners 32. For sake of clarity, the pivot means for the gyro (26 and 25 of FIG. 1) are not shown in FIG. 2. The pivot axis 21 is identified, it being realized that the gyro rotor pivots with respect to the platform 10 about precession axis 21.

A fluid dashpot 34 is fixed-mounted to platform 10 and includes a cylinder 35 containing fluid 36. Piston member 37 is fixed to linear motion shaft 38 which passes through opening 39 in the platform. The axis of shaft 38 is coincident with an axis normal to the median general rotational plane of gyro 19. Dashpot shaft 38 is connected to the gyro rotor housing by a toggle link 40 which is pivotably mounted at 41 to the dashpot shaft and pivotably mounted at 42 to the bracket 31 extending from the gyro rotor housing 24. As depicted in dashed lines in FIG. 2, as gyro rotor housing precesses through angle $\alpha$, by rotation about axis 21, pivot point 42 is caused to follow an arcuate path defined by the radium 21-42 and the dashpot shaft 38 is imparted with a linear downward motion. Throughout design ranges of precession angle $\alpha$, a very linear motion is imparted to the dashpot shaft 38, due to the toggle action of the linkage member 40. However, for precession angles $\alpha$ of greater magnitude, increasing increments of precession angle $\alpha$ impart successively greater increments of linear motion to the dashpot shaft, and shaft 38 is imparted with increasing greater linear velocities that are resisted by the fluid 36 in the dashpot, thereby effecting a momentary "caging" action on the gyro.

As further depicted in FIG. 2, the fluid dashpot 34 is fitted with upper and lower chamber ports 42 and 43 communicating via lines 44 and 45 with a fluid reservoir 46. A control valve 47 may optionally be placed, as in upper chamber line 44, to provide greater restriction to fluid flow from reservoir 46 into upper chamber port 42 than that imposed on fluid flow from port 42 to the reservoir, thereby imposing a greater damping on downward motion of dashpot arm 38 than upon upward motion thereof. The greater damping imposed during downward motion aids in the desired caging during gyro precession, while the ensuing gyro referencing back to gravity reference is desirably less damped by the dashpot member.

It is seen that the toggle action of the toggle action of the linkage between gyro motor housing and dashpot arm in FIG. 2 defines a geometry which imparts little or no linear motion to dashpot arm 38 for smaller values $\alpha$ from the vertical reference (smaller precession angles), since the downward component of linkage arm pivot point 42 movement is correspondingly small. Thus, very small increments of linear motion are imparted to dashpot arm 38 for small precession angle increments either side of the median vertical reference, and such linear motion as is imparted is at very small rates In the precession angle range as depicted by $\alpha$, in FIG. 2, incremental increases in $\alpha$ impart appreciable downward motion to the dashpot arm and progressively greater dashpot arm linear rates are effected. Stated another way, as the precession angle $\alpha$ increases, proportionally greater dashpot arm linear motion magnitudes and rates are imparted.

The relationship of linear dashpot velocity and angular precession velocity as a function of angular displacement (linkage characteristics) is depicted in FIG. 3. At precession angles $\alpha$, greater than the 20° range, the linear dashpot velocities are seen to sharply rise, i.e., there is a magnification of the linear dashpot velocity resulting from any precession angular velocity. The higher linear velocities imparted to the dashpot introduce correspondingly greater damping sufficient to momentarily restrain gyro precession and permit vertical re-orientation of the system.

FIG. 4 shows an alternate linkage mechanism between gyro rotor housing and dashpot arm, to accomplish the caging objectives by employing a cam/cam-follower linkage arrangement. Here bracket member 31', attached to the gyro rotor housing 24, is formed with a cam slot 48 within which a roller member 49 rides. Roller member 49 (the cam-follower) is affixed to the lower end of linkage arm 50. The upper end of linkage arm 50 is pivotably connected at 51 to the dashpot linear motion arm 38. A bracket member 52 is affixed to, and extends downwardly from, platform 10 to provide a mount to guide rollers 53 and 54 which ride on respective opposite sides of arm 50. Gyro rotor housing 24 is pivotably mounted, as in FIG. 2, by means of brackets (not shown) affixed to the platform 10 to define the gyro precession axis 21.

The cam slot 48 in bracket 31' is formed with a central radium of curvature (over a central range of system design precession angles either side of the median vertical reference) as defined by the radius from precession axis 21 to the slot 48. Gyro pivot action about precession axis 21 over this central range imparts no linear motion to the linkage arm 50, since roller member 49 merely rolls on the cam slot surface. With precession angles in excess of system design range, roller member 49 on arm 50 engages the end regions (55 or 56) of the cam slot 48. These end regions are formed with a progressively smaller radius of curvature such that precession of the gyro about axis 21 beyond the aforedescribed central range imparts a downward motion to linkage arm 50 which is resisted by the fluid 36 in dashpot 34 to thereby impose a damping action sufficient to momentarily cage the gyro and effect vertical re-referencing. The cam slot 48 may be formed as desired to introduce dashpot arm downward linear motion magnitudes and rates as a desired increasing function of gyro precession angle.

As in the FIG. 2 embodiment, the damping introduced by the dashpot linkage is enhanced by mechanical friction increases as the system is displaced from its nominal center position. In either of the embodiments of FIGS. 2 and 4, a pivoting action is introduced which causes the dashpot arm and/or linkage arm to have side forces introduced which generate mechanical friction against fixed guide restraints in addition to the damping action imposed by the fluid in the dashpot as concerns dashpot arm linear motion. In either embodiment, the objectives are realized by a linkage between gyro housing and dashpot arm, which is pivotably attached to each of these members, such that gyro precession over a design range either side of nominal center position is substantially unimpeded due to the linkage toggle action, while precession angles in excess of system design angles introduce dashpot arm linear motion which is resisted by the dashpot fluid, thereby automatically intorducing a momentary caging action sufficient to permit system re-referencing to gravity.

While the caging system described herein (as employed, for example, in an open loop gyro stabilized shipboard stable platform) does not prevent a system error from being caused by abnormal conditions, it does prevent the error from being sustained, once the ship's motion is reduced to a value within the design limits of the stabilization system.

Whereas this invention is herein illustrated and described with respect to particular embodiments thereof, it should be realized that various changes may be made without departing from essential contributions to the art made by the teachings hereof.

We claim:

1. A fluid caging system for a platform mounted gyro having a single degree of freedom, wherein the gyro rotor assembly housing is gimbal pivotally mounted with respect to said platform to define a precession axis relative to said platform, comprising: a gyro stabilized platform; a gyro with a gyro rotor assembly gimbal pivotally mounted with a single degree of freedom; dashpot means affixed to said platform and having a linear movement member extending therefrom along a linear motion axis normal to the median general rotational plane of said gyro rotor, a toggle linkage arm means having respective ends thereof pivotally connected to said dashpot linear movement member and said gyro rotor housing about respective pivot axis parallel to said gyro precession axis; said toggle linkage arm means effecting an amplification of the ratio of dashpot linear motion member velocity to gyro angular precession velocity for gyro rotor angular displacements in excess of predetermined design limits; and with said linkage arm means comprising an arm member having a first end thereof pivotally connected to said dashpot linear movement member, the other end of said arm member carrying cam-follower means, said gyro rotor housing carrying thereon an arcuate cam-face member being defined by substantially fixed radii from said gyro precession axis throughout a range either side of the spin axis of said gyro and terminated in respective end portions of progressively lesser radius; and guide roller means fixed mounted to said platform and engaging said arm member to substantially preclude pivot action of said arm member with respect to said dashpot linear movement member; whereby precession movements of said gyro are substantially non-restricted over a predetermined range of precession angles and damped beyond said predetermined range.

2. The fluid caging system of claim 1, with said dashpot means comprising a double acting fluid containing cylinder with piston, said linear movement member comprising a rod member affixed to said piston and extending from said cylinder, fluid ports communicating with respective upper and lower cylinder chambers and a fluid reservoir, and check valve means connected between the upper cylinder port and reservoir to permit a lesser impeded fluid flow between upper cylinder and reservoir than between reservoir and upper cylinder.

3. In a gimbal mounted platform level stabilizing system of the open-loop type having platform mounted gyros each with gimbal pivotal mountings respectively defining each of mutually orthogonal precession axes parallel to respective platform gimbal defined pitch and roll axes: a fluid caging system for each said gyro; and with each said caging system comprising, dashpot means affixed to said platform and having a linear movement member extending therefrom along a linear motion axis normal to the median general rotational plane of the rotor of the associated gyro, a toggle linkage arm means having respective ends thereof pivotally connected to said dashpot linear movement member to the rotor housing of the associated gyro about respective pivot axes each parallel to the associated gyro precession axis; said toggle linkage arm means effecting an amplification of the ratio of dashpot linear movement member velocity to gyro angular precession velocity for gyro rotor angular displacements in excess of predetermined design limits; and with said linkage arm means comprising an arm member having a first end thereof pivotally conected to said dashpot linear movement member, the other end of said arm member carrying cam-follower means, said gyro rotor housing carrying thereon an arcuate cam-face member being defined by a substantially fixed radii from said gyro precession axis throughout a range either side of the spin axis of said gyro and terminated in respective end portions of progressively lesser radius, and guide roller means fixed mounted to said platform and engaging said arm member to substantially preclude pivot action of said arm member with respect to said dashpot linear movement member; whereby precession movements of said gyros are substantially non-restricted over a predetermined range of precession angles and damped beyond said predetermined range.

4. The fluid caging system of claim 3, with each said dashpot means comprising a double acting fluid containing cylinder with piston, said linear movement member comprising a rod member affixed to said piston and extending from said cylinder, fluid ports communicating with respective upper and lower cylinder chambers and a fluid reservoir, and check valve means connected between the upper cylinder port and reservoir to permit a lesser impeded fluid flow between upper cylinder and reservoir than between said reservoir and said upper cylinder.

* * * * *